(12) United States Patent
Jerome (10) Patent No.: US 9,914,208 B2
(45) Date of Patent: *Mar. 13, 2018

(54) IMPLEMENT ORGANIZER (71) Applicant: Piavazelle Chaney Jerome, Decatur, GA (US)

(72) Inventor: Piavazelle Chaney Jerome, Decatur, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/463,794

(22) Filed: Mar. 20, 2017

(65) Prior Publication Data

US 2017/0274521 A1 Sep. 28, 2017

Related U.S. Application Data (63) Continuation of application No. 15/078,235, filed on Mar. 23, 2016, now Pat. No. 9,629,458.

(51) Int. Cl.
| | |
|---|---|
| *B25H 3/02* | (2006.01) |
| *A47B 55/06* | (2006.01) |
| *B62B 3/00* | (2006.01) |
| *G05D 1/00* | (2006.01) |
| *B25H 3/04* | (2006.01) |

(52) U.S. Cl.
CPC .............. *B25H 3/022* (2013.01); *A47B 55/06* (2013.01); *B25H 3/04* (2013.01); *B62B 3/005* (2013.01); *G05D 1/0016* (2013.01)

(58) Field of Classification Search
CPC ......... B62B 3/002; B62B 3/003; B62B 3/005; B62B 3/04; B62B 3/10; B62B 3/102; B62B 2202/48; B62B 2202/50; B62B 2203/00; B62B 2501/062; B25H 3/00; A47B 2031/002; A47B 2031/003; A47B 2031/008; A47B 81/00; A47B 2220/0086; A47B 2220/0052; A47B 2220/0083; A47B 47/0066; A47B 47/0075; A47B 47/06; A47B 55/06; A47B 43/04; B65D 5/48;

(Continued)

(56) References Cited

U.S. PATENT DOCUMENTS

| | | |
|---|---|---|
| 2,055,890 A | 9/1936 | Berry |
| D158,876 S | 6/1950 | Lowell |

(Continued)

FOREIGN PATENT DOCUMENTS

DE     10064490 C1     3/2002

OTHER PUBLICATIONS

United States Patent and Trademark Office, Notice of Allowance for U.S. Appl. No. 15/078,235, dated Mar. 17, 2017, 17 pages, U.S.A.

*Primary Examiner* — Andrew M Roersma
(74) *Attorney, Agent, or Firm* — Alston & Bird LLP (57) ABSTRACT

Various embodiments are directed to an implement organizer configured for storage of various implements (e.g., tools, craft supplies, utensils, and/or the like) for easy access. Various embodiments comprise a base portion; a plurality of walls extending vertically away from a perimeter of the base portion to define an interior portion; and a flexible liner covering the interior and exterior surfaces of the plurality of walls. At least one of the walls defines an access opening extending through the at least one wall and a portion of the flexible liner covering the exterior surface of the wall such that the access opening permits access to a volume between the interior surface of the wall and a portion of the flexible liner covering the interior surface of the wall.

19 Claims, 4 Drawing Sheets

(58) Field of Classification Search
CPC ...... B65D 25/20; B65D 25/005; B65D 25/54;
B65D 43/16; B65D 43/162; B65D 51/26
USPC .............................................. 280/47.35, 79.2
See application file for complete search history.

(56) References Cited

U.S. PATENT DOCUMENTS

| | | |
|---|---|---|
| 3,145,031 A | 8/1964 | Wilkinson |
| 3,573,879 A | 4/1971 | Bergkamp et al. |
| 6,085,902 A | 7/2000 | Fang |
| 2013/0001118 A1 | 1/2013 | Kinskey et al. |
| 2013/0341338 A1 | 12/2013 | Mitchell et al. |
| 2014/0262861 A1 | 9/2014 | Crowe et al. |

IMPLEMENT ORGANIZER

CROSS-REFERENCE TO RELATED APPLICATIONS

This application is a continuation of and claims priority to and the benefit of U.S. Nonprovisional patent application Ser. No. 15/078,235, filed Mar. 23, 2016, the contents of which as are hereby incorporated by reference in their entirety.

FIELD

This application describes concepts for organizing implements (e.g., tools, craft supplies, utensils, and/or the like) in an easily accessible device.

BACKGROUND

Many activities involving the use of multiple implements (e.g., tools, craft supplies, utensils, and/or the like) are performed in an area having limited working space (e.g., a room, on a table, in an area within reach of a user, and/or the like), and accordingly users are often required to move various implements while performing various tasks. For example, when sewing clothing, seamstresses often utilize several scissors, rulers, needles, bobbins, notions, and/or the like, throughout the sewing processes, however only a subset of these implements are typically utilized in any given instance. Thus, the remaining, unused implements may be moved to an unobtrusive portion of the working area until needed. However, constantly moving the implements may be time consuming, and may undesirably move various portions of a work piece, thereby damaging or otherwise negatively impacting the work piece.

Accordingly, a need exists for a physical time management and storage device configured to store a plurality of implements while enabling easy access to each of the implements during use.

BRIEF SUMMARY

According to various embodiments, there is provided a physical time management implement organizer. The organizer comprises: a base portion; a plurality of walls extending vertically away from a perimeter of the base portion to define an interior portion, wherein each of the plurality of walls defines an interior surface adjacent the interior of the wall and an exterior surface opposite the interior surface; and a flexible liner covering the plurality of walls, wherein the flexible liner extends to cover the interior surfaces of the walls and the exterior surfaces of the walls; and wherein at least one of the plurality of walls defines an access opening, wherein the access opening extends through the at least one wall and a portion of the flexible liner covering the exterior surface of the walls such that the access opening permits access to a volume between the interior surface of the wall and a portion of the flexible liner covering the interior surface of the wall.

According to still other embodiments, there is provided an implement organizer that comprises: a base portion; a plurality of walls extending vertically away from a perimeter of the base portion to define an interior portion, wherein each of the plurality of walls defines an interior surface adjacent the interior of the wall and an exterior surface opposite the interior surface; a flexible liner covering the plurality of walls, wherein the flexible liner extends to cover the interior surfaces of the walls and the exterior surfaces of the walls, wherein: at least one of the plurality of walls defines an access opening, and the access opening extends through the at least one wall and a portion of the flexible liner covering the exterior surface of the walls such that the access opening permits access to a volume between the interior surface of the wall and a portion of the flexible liner covering the interior surface of the wall; one or more storage pockets secured relative to the plurality of walls; one or more storage racks secured relative to the plurality of walls; wheels secured to the base portion and configured to support the implement organizer above a support surface; and a flap associated with the access opening, wherein the flap is secured to the wall adjacent the access opening at a rotation end and extends at least partially over the access opening to a free end.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to an implement organizer comprising a plurality of walls collectively defining a main storage area. In various embodiments, the implement organizer may be lined with a flexible liner extending around the plurality of walls and within the main storage area. For example, the walls may be lined with a fabric sheet. The fabric sheet may extend both within the main storage area and around the exterior of the implement organizer. The implement organizer may be utilized to organize implements utilized in any of a variety of activities. For example, the implement organizer may be utilized to organize implements utilized for drawing (e.g., pencils, pens, and/or the like), cutting (razorblades, knives, and/or the like), assembling of items (e.g., assembly tools), leatherwork, tanning, quilting, pottery, woodworking (e.g., chisels, hammers, fasteners, measurement devices, and/or the like), stonework, beadwork, sewing (e.g., needles, rulers, bobbins, scissors, rotary cutters, tweezer, and/or the like), planting (e.g., shovels, rakes, and/or the like), working with animals (e.g., brushes, nail clippers, scissors, and/or the like), working with dirt, working with sand, blacksmithing, jewelry-making, and/or the like.

The implement organizer may comprise a plurality of storage compartments and/or storage devices configured to store various implements therein. Moreover, at least one of the walls may define an access opening extending therethrough such that implements may be placed through the at least one wall and into the space between the wall and the liner. Thus, implements placed through the access opening do not extend substantially into the main storage area, however they are protected by the wall.

Figure 1:
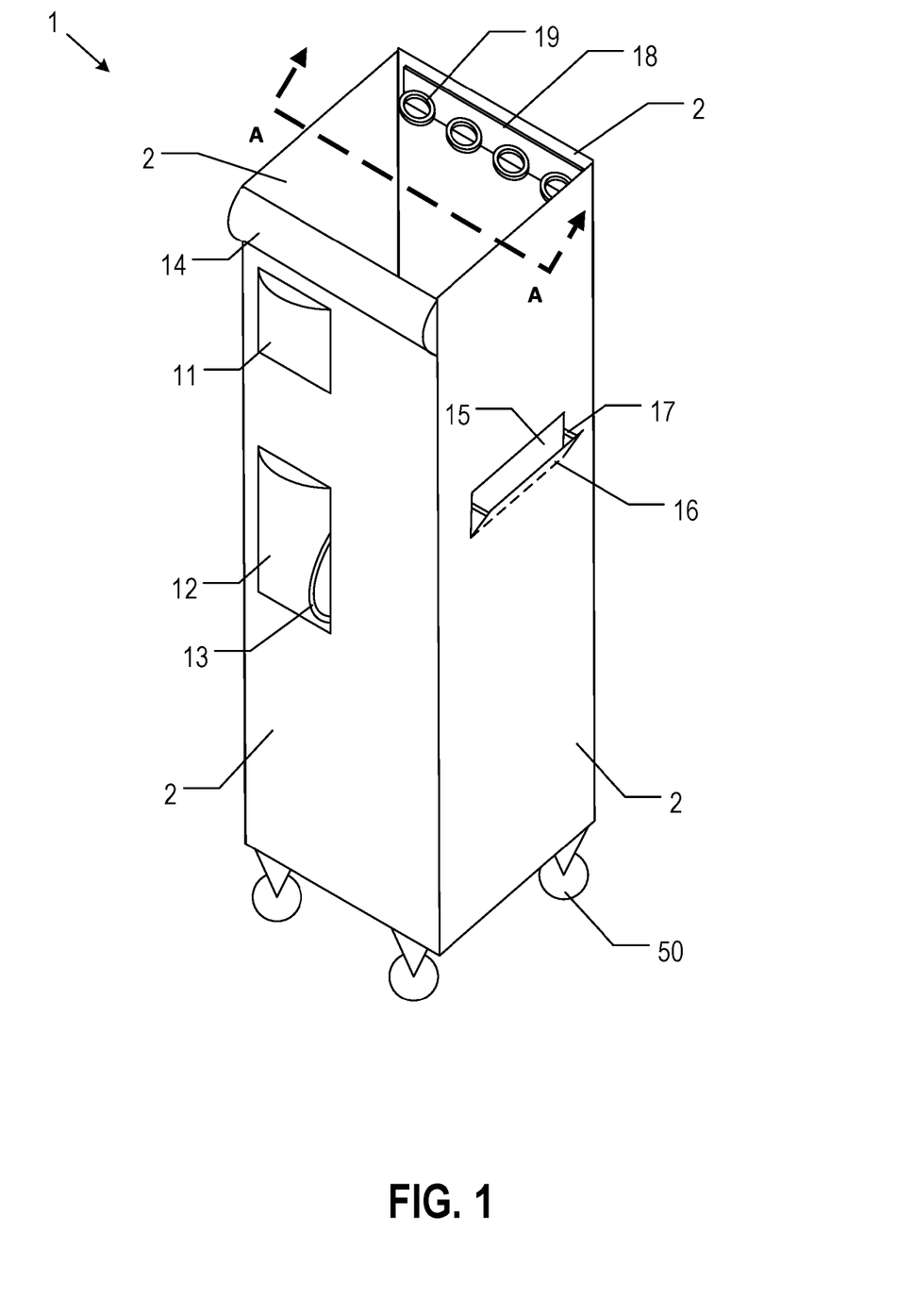
FIG. 1 is a perspective view of an implement organizer according to one embodiment.

FIG. 1 illustrates an implement organizer 1 according to one embodiment. As shown in FIG. 1, the implement organizer comprises a plurality of walls 2 collectively defining an interior storage area. Each of the walls 2 define a wall height measured between a bottom edge and a top edge of the corresponding wall 2, perpendicular to a support surface; and a wall width, measured between side edges of the corresponding wall 2, perpendicular to the wall height. Collectively, the plurality of walls 2 define a height of the implement organizer 1 (measured parallel to the wall height), a width of the implement organizer 1 (measured parallel to the width of at least one wall width), and a length of the implement organizer 1 (measured parallel to the width of at least one wall width, and perpendicular to the width of the implement organizer). As just one example embodiment, the implement organizer 1 may comprise four walls 2 arranged in a substantially rectangular orientation, defining an implement organizer 1 having a height of 28 inches, a width of 8 inches, and a length of 8 inches.

As shown in FIG. 1, the interior storage area may have an open top, and may have an enclosed bottom portion (e.g., by a floor). In various embodiments, the walls 2 may comprise a rigid and/or semi-rigid material, such as cardboard, wood, metal, plastic, corkboard, and/or the like. Moreover, the floor (not shown in FIG. 1) may comprise cardboard, wood, metal, plastic, corkboard, and/or the like. As a specific example implementation, the plurality of walls may comprise cardboard and the floor may comprise corkboard.

Although not separately shown in FIG. 1, the implement organizer may be encased in a flexible liner that extends around the plurality of walls and into the interior storage area. The flexible liner may be shaped to conform to the shape of the implement organizer 1. With reference to the example implement organizer shown in FIG. 1, the liner may be square shaped, such that the interior storage area is lined with a square-shaped interior liner that extends over the entire height of the interior of the storage area.

In various embodiments, the flexible liner may comprise a fabric liner (e.g., an elastic or inelastic fabric). In various embodiments, the fabric may be water resistant and/or waterproof, it may be puncture resistant (e.g., ballistic fabric), and/or the like. Moreover, the flexible liner may be detachably secured relative to the walls 2 (and/or other portions of the implement organizer 1), such that the flexible liner may be removed for easy cleaning and/or replacement. For example, the flexible liner may be fastened to the implement organizer 1 via one or more detachable snaps, elastic bands (e.g., secured to the flexible liner and extending around the bottom portion of the implement organizer 1, and/or the like). However, in certain embodiments, the flexible liner may be secured to other portions of the implement organizer 1 such that the flexible liner cannot be removed therefrom. For example, the flexible liner may be fastened to the walls via one or more permanent fasteners (e.g., glue, double sided tape, and/or the like).

With reference again to FIG. 1, the implement organizer 1 comprises a plurality of pockets disposed around the exterior of the implement organizer 1. For example, as shown in FIG. 1, a first side of the implement organizer 1 may have a first pocket 11 and a second pocket 12 disposed thereon. The first pocket 11 and the second pocket 12 may be secured relative to the flexible liner and/or to the first wall 2. Moreover, the first side may additionally comprise a first handle 13 configured to facilitate lifting the implement organizer 1. In various embodiments, the first handle 13 may be secured relative to the flexible liner and/or the first wall. Moreover, as shown in FIG. 1, the first side of the implement organizer may comprise a pin cushion 14 and/or other storage devices secured thereto. As shown in FIG. 1, the pin cushion 14 may extend along the entire width of the first side. However, the pin cushion 14 may also extend around the entire perimeter of the implement organizer 1, and/or may extend only across a portion of the width of the first side.

With reference still to FIG. 1, a second side of the implement organizer 1 may define an access opening 15 and associated flap 16. In various embodiments, the flap 16 may be a part of the wall that is cut from the wall along a plurality of sides, such that a single side of the flap 16 remains secured to the wall 2. In various embodiments, the flap 16 is encased in flexible liner, such that the access opening 15 is accessible through the flexible liner adjacent the exterior of the implement organizer 1. Moreover, in various embodiments, the flap 16 may be secured to the remainder of the wall 2 via support webs 17. In various embodiments, the support webs 17 may be secured relative to the flexible liner and/or the flap 16 and wall 2. The support webs 17 may comprise a ribbon of elastic and/or inelastic fabric configured to prevent and/or impede the flap 15 from extending away from the wall 2. As yet another example, the support webs 17 may comprise a fabric webbing extending between the flap 16 and the wall 2 along the entire length of an edge of the flap 16.

Because the flap 16 is secured relative to the wall 2 via the support webs 17, elongated implements placed through the access opening 15 may be supported at least in part by the flap 16 such that the elongated implements are prevented from rotating about an axis substantially aligned with the bottom edge of the access opening 15.

As an example embodiment, the access opening 15 and associated flap 16 may be configured to accept an elongated ruler (e.g., a ruler utilized in sewing). As just one embodiment, the access opening 15 and associated flap 16 may have a width of approximately 6 inches (measured in a direction parallel to the width of the corresponding wall 2), and a height of approximately 5.5 inches (measured in a direction parallel to the height of the corresponding wall 2). Such a configuration may permit a ruler to be conveniently placed through the access opening and removed from the access opening. Moreover, in various embodiments the access opening 15 and associated flap 16 are positioned approximately 13.5 inches away from a bottom edge of a corresponding wall 2. Such configurations may permit a ruler longer than 13.5 inches to be placed through the access opening 15 to be stored therein, while ensuring that at least a portion of the ruler is visible outside of the access opening 15 for easy access and removal. Accordingly, the elongated ruler (or other implement) may be stored within the access opening 15, thereby ensuring the implement receives protection provided by the walls 2, while ensuring the implement does not substantially obstruct the area within the interior of the implement organizer 1.

Moreover, with reference still to FIG. 1, the implement organizer 1 may additionally comprise a storage rack 18 secured to an interior side of a wall 2 (e.g., a third wall 2). The storage rack 18 may comprise a plurality of implements holsters 19 configured to secure a plurality of implements therein. In various embodiments, the storage rack 18 may be secured by one or more fasteners to the wall 2 and/or the flexible liner. For example, the storage rack 18 may be glued to the wall 2, taped to the wall screwed to the wall 2, otherwise hooked to the wall 2, and/or the like.

Figure 2:
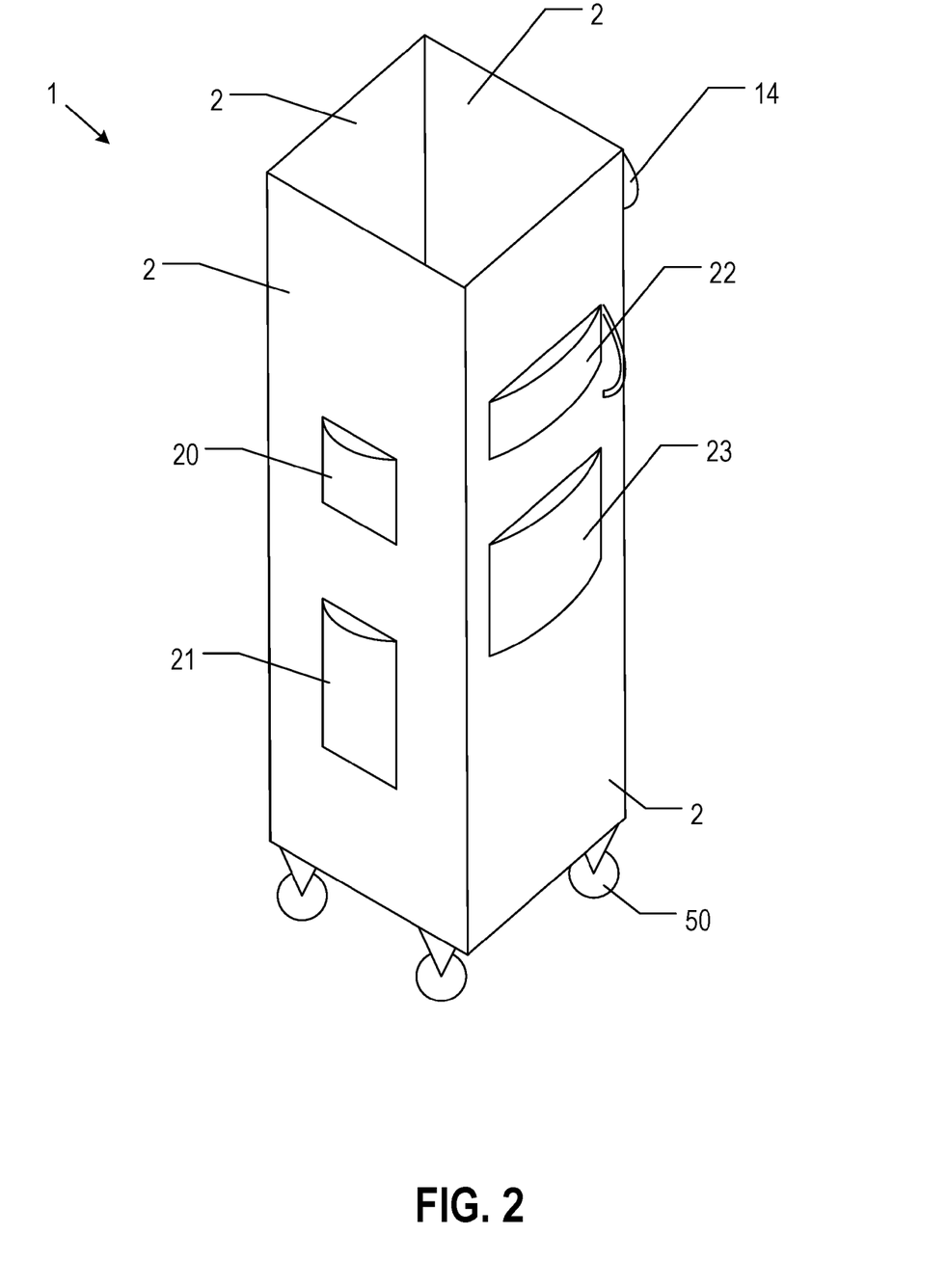
FIG. 2 is a perspective view of an implement organizer according to one embodiment.

With reference now to FIG. 2, which illustrates the implement organizer 1 as viewed from a different perspective in which the exterior of a third and fourth wall 2 are visible. As shown in FIG. 2, the third side may comprise one or more pockets 20, 21. Like pockets 11 and 12, the one or more pockets of the third side 20, 21 may be secured relative to the flexible liner and/or the wall 2.

Similarly, the fourth side of the implement organizer 1, as visible in FIG. 2, may comprise one or more pockets 22, 23. Like pockets 11 and 12, the one or more pockets of the third side 20, 21 may be secured relative to the flexible liner and/or the wall 2.

Moreover, as shown in both FIGS. 1 and 2, the implement organizer 1 may be supported by one or more wheels 50. In various embodiments, the wheels may be secured relative to a floor of the implement organizer 1. The wheels 50 may be swivel wheels, configured to permit the direction of the wheels to change in order to facilitate movement of the implement organizer 1 along a support surface. Moreover, although not shown, the implement organizer 1 may be pivotably secured relative to a base, such that the implement organizer 1 may be pivoted to facilitate easy access to various portions of the implement organizer 1 (e.g., various storage pockets). Still further, although not shown, the implement organizer 1 may be configured such that it may be remote-controllable, so as to enable a user thereof—when seated remote from the organizer—to direct (i.e., drive the wheels of) the organizer to move the same to a new physical location. Yet even still further, at least a portion of the base may be provided with magnetic characteristics, so as to facilitate "pick-up" of sewing pins (or other metallic objects) on a work-floor, such that movement of the organizer 1 as described above results in "pick-up" of such items without the need for the user to stand or relocate physically. In still other embodiments, the implement organizer 1 may be further equipped with a vacuum-like attachment, so as to facilitate cleaning of the workspace with relative ease, for example, for users who have difficulty moving repetitively.

Figure 3:
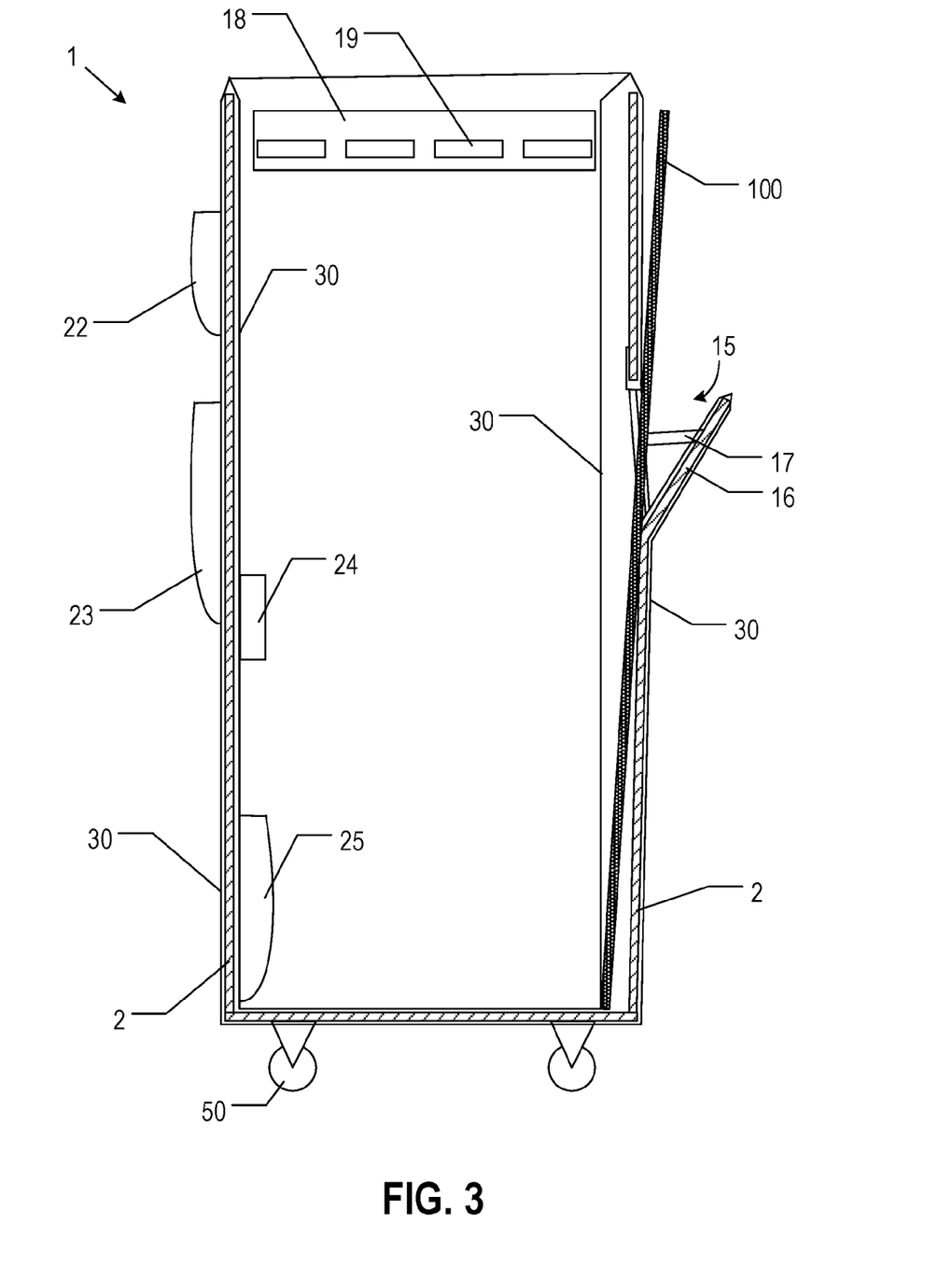
FIG. 3 is a cut-away view of an interior of an implement organizer taken along section line A-A shown in FIG. 1.

FIG. 3 shows a cutaway view of the implement organizer 1 along section line A-A shown in FIG. 1. As shown in FIG. 3, the access opening 15 extends through the wall 2, however, the access opening does not extend though an interior portion of the flexible liner 30. Accordingly, an elongated implement 100 may be directed through the access opening 15 and between the interior surface of the wall 2 and the flexible liner 30, as shown in FIG. 3.

Figure 4:
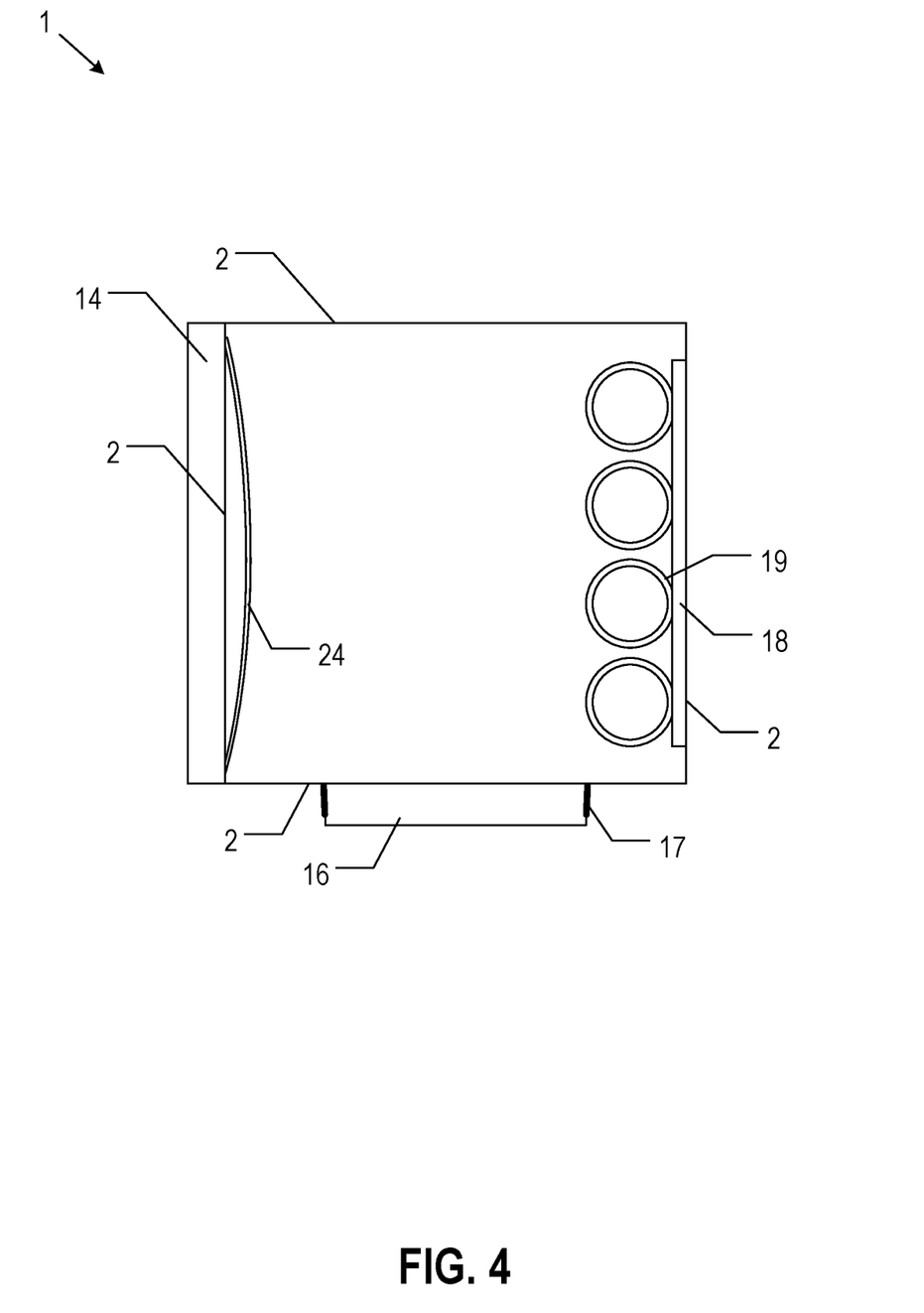
FIG. 4 is a top view of an implement organizer according to one embodiment.

Moreover, as shown in FIG. 3, the implement organizer 1 may comprise a support sleeve 24 and/or a storage pocket 25 secured relative to an interior portion of the main storage area. As shown in FIG. 3, the support sleeve 24 may be positioned vertically above the storage pocket 25, such that items placed through the support sleeve 24 may be positioned within the storage pocket 25. As shown in FIG. 4, which is a top-view of the implement organizer 1, the support sleeve 24 may be aligned with the storage pocket 25 such that elongated implements protruding from the storage pocket 25 are supported by the support sleeve 24. In various embodiments, the support sleeve 24 may be secured relative to the flexible liner and/or the wall 2. Similarly, the storage pocket 25 may be secured relative to the flexible liner and/or the wall 2.

In various embodiments, one or more walls 2 may additionally comprise a support loop extending at least substantially vertically away from a top edge thereof 2. The support loops may be configured to support the implement organizer 1 hung from an external support. For example, the implement organizer 1 may be hung from a coat-hanger, a drawer handle, a fastener secured relative to a vertical support surface, and/or the like.

Although the illustrated implement organizer 1 is shown as having an at least substantially rectangular footprint (e.g., a square footprint) having four walls 2, it should be understood that various embodiments may have any number of walls, and the corresponding implement organizer 1 may have a corresponding shape. For example, the implement organizer 1 may have a continuous, circular, oval, and/or elliptical wall extending around the entirety of the perimeter of the implement organizer 1. As yet another example, the implement organizer 1 may have a triangular shape having three walls 2, a pentagonal shape having five walls 2, and/or the like. Each of the walls may have one or more pockets secured thereto, as described herein. The one or more pockets may be secured relative to the interior of the walls 2 and/or the exterior of the walls 2.

Moreover, although not shown, the interior of the implement organizer 1 may comprise a plurality of dividers to divide the interior of the implement organizer 1 into a plurality of separated compartments. Each of the dividers may extend along the entire height of the implement organizer 1 or may extend along only a portion of the height of the implement organizer 1.

As yet another embodiment, the implement organizer 1 may comprise a lid configured to be secured across the open upper opening of the implement organizer 1. The lid may be pivotably secured relative to one or more of the walls 2 and/or the flexible liner, and may be configured to be detachably secured relative to one or more walls 2 and/or another portion of the flexible liner to secure the lid across the open top portion of the implement organizer 1. In certain embodiments, the implement organizer 1 may comprise a cover configured to be secured around the exterior of the implement organizer 1 such that the entirety of the implement organizer 1 and any implements stored therein are positioned within the cover. In various embodiments, the cover may be secured to the exterior of the implement organizer 1 relative to the floor, such that the cover may be selectably deployed by raising the cover around the implement organizer 1. Moreover, the cover may be selectably secured above the top portion of the implement organizer 1 to enclose the implement organizer 1. In various embodiments, the cover 1 may comprise a zipper enclosure or another fastener enclosure. For example, the zipper enclosure may extend from a top portion of the cover (positioned above the top portion of the implement organizer 1 while the cover is deployed) to a bottom portion of the cover (positioned proximate a floor of the implement organizer 1). Moreover, in various embodiments, the cover may comprise a flexible material (e.g., a fabric). In certain embodiments, the cover may comprise an elastic material configured to apply a compressive force against the exterior of the implement organizer 1 to impede unintended movement of implements stored therein.

In various embodiments, the implement organizer 1 may comprise one or more walls 2 that do not collectively define an interior region. In such embodiments, the walls 2 may be secured relative to a flexible liner, which is configured to enable the implement organizer 1 to be draped across a surface. For example, the implement organizer 1 may comprise one or more walls 2 secured relative to a flexible liner that is configured to be draped across an open drawer such that each of the walls 2 are positioned on opposite sides of the open drawer. As yet another example, each of the walls 2 may be secured relative to a flexible liner configured to be draped across a chair back, such that the walls 2 are positioned on opposite sides of the chair back. In such embodiments, each of the walls 2 may be associated with one or more pockets, flaps, supports, and/or the like, as described herein. In such embodiments, the pockets and/or supports may be secured relative to the walls 2 and/or the flexible liner. Moreover, as described herein, the flaps may be associated with an access opening extending through the corresponding wall 2, as described herein.

Moreover, although the relative positioning of various storage pockets, access openings, flaps, storage racks, support sleeves, and/or the like have been desired relative to particular locations around an implement organizer 1, it should be understood that such positioning is provided merely as just one example, and other configurations are within the scope of this disclosure. For example, an implement organizer 1 may comprise a plurality of access openings 15 and associated flaps 16 each positioned on a corresponding wall 2 of the implement organizer 1. Moreover, walls including an access opening 15 and associated flap 16 may additionally comprise one or more storage pockets positioned above and/or below the access opening 15.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. An implement organizer comprising:
a base portion;
at least one wall extending vertically away from a perimeter of the base portion to define an interior storage area, wherein the at least one wall at least in part defines an interior surface adjacent the interior storage area and an exterior surface opposite the interior surface; and
a flexible liner covering at least a portion of the at least one wall, wherein the flexible liner extends to cover at least a portion of the interior and exterior surfaces of the at least one wall,
wherein a portion of the at least one wall and the flexible liner define an access opening, wherein the access opening extends through the portion of the at least one wall and the flexible liner, such that the access opening permits access to a volume between the interior surface and the flexible liner.
2. The implement organizer of claim 1, further comprising a flap associated with the access opening, wherein the flap is secured to the at least one wall adjacent the access opening at a rotation end and extends at least partially over the access opening to a free end.
3. The implement organizer of claim 2, further comprising a support web securing the flap to the at least one wall to limit rotation of the flap about the rotation end, wherein the support web is secured to the flap at a position between the free end and the rotation end.

4. The implement organizer of claim 1, wherein the at least one wall comprises cardboard.
5. The implement organizer of claim 1, wherein the base portion comprises corkboard.
6. The implement organizer of claim 1, wherein the flexible liner comprises a fabric.
7. The implement organizer of claim 1, further comprising one or more storage pockets secured to the at least one wall.
8. The implement organizer of claim 7, wherein one or more of the storage pockets are secured to the exterior surface of the at least one wall.
9. The implement organizer of claim 7, wherein one or more of the storage pockets are secured to the interior surface of the at least one wall.
10. The implement organizer of claim 1, further comprising one or more storage pockets secured the flexible liner.
11. The implement organizer of claim 1, further comprising an implement storage rack secured to the at least one wall.
12. The implement organizer of claim 11, wherein the storage rack is secured relative to the interior surface of the at least one wall.
13. The implement organizer of claim 1, further comprising wheels secured to the base portion and configured to support the implement organizer above a support surface.
14. The implement organizer of claim 13, wherein the implement organizer is remote-controllable, so as to enable a user thereof, when located at a position remote from the organizer, to remotely drive the wheels of the implement organizer.
15. An implement organizer comprising:
a base portion;
at least one wall extending vertically away from a perimeter of the base portion to define an interior storage area, wherein the at least one wall at least in part defines an interior surface adjacent the interior storage area and an exterior surface opposite the interior surface;
a flexible liner covering at least a portion of the at least one wall, wherein the flexible liner extends to cover at least a portion of the interior and exterior surfaces of the at least one wall, wherein a portion of the at least one wall and the flexible liner define an access opening, wherein the access opening extends through the portion of the at least one wall and the flexible liner, such that the access opening permits access to a volume between the interior surface and the flexible liner;
one or more storage pockets secured at least one surface of the at least one wall; and
a plurality of wheels secured to the base portion and configured to support the implement organizer above a support surface.
16. The implement organizer of claim 15, wherein:
the at least one wall comprises cardboard;
the base portion comprises corkboard; and
the flexible liner comprises a fabric.
17. The implement organizer of claim 15, further comprising a flap associated with the access opening, wherein the flap is secured to the at least one of the plurality of walls adjacent the access opening at a rotation end and extends at least partially over the access opening to a free end.
18. The implement organizer of claim 17, further comprising a support web securing the flap to the at least one of the plurality of walls to limit rotation of the flap about the rotation end, wherein the support web is secured to the flap at a position between the free end and the rotation end.
19. The implement organizer of claim 15, wherein the implement organizer is remote-controllable, so as to enable a user thereof, when located at a position remote from the organizer, to remotely drive at least a portion of the plurality of wheels of the implement organizer.

\* \* \* \* \*